(12) United States Patent
Hong et al.

(10) Patent No.: US 7,502,736 B2
(45) Date of Patent: Mar. 10, 2009

(54) VOICE REGISTRATION METHOD AND SYSTEM, AND VOICE RECOGNITION METHOD AND SYSTEM BASED ON VOICE REGISTRATION METHOD AND SYSTEM

(75) Inventors: Sang-jin Hong, Suwon (KR); Sung-zoo Lee, Suwon (KR); Tae-soo Kim, Suwon (KR); Tae-sung Lee, Suwon (KR); Ho-jin Choi, Suwon (KR); Byoung-won Hwang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 938 days.

(21) Appl. No.: 10/486,258

(22) PCT Filed: Dec. 6, 2001

(86) PCT No.: PCT/KR01/02105

§ 371 (c)(1),
(2), (4) Date: Sep. 21, 2004

(87) PCT Pub. No.: WO03/015078

PCT Pub. Date: Feb. 20, 2003

(65) Prior Publication Data

US 2005/0033573 A1   Feb. 10, 2005

(30) Foreign Application Priority Data

Aug. 9, 2001   (KR) .................. 2001-48059

(51) Int. Cl.
*G10L 15/06* (2006.01)
*G10L 15/16* (2006.01)
*G10L 17/00* (2006.01)

(52) U.S. Cl. .................. 704/232; 704/243; 704/246

(58) Field of Classification Search .................. 704/231, 704/232, 234, 243, 244, 246
See application file for complete search history.

(56) References Cited

U.S. PATENT DOCUMENTS 4,394,538 A * 7/1983 Warren et al. ............... 704/252

(Continued)

FOREIGN PATENT DOCUMENTS

EP   0 592 150   4/1994

(Continued)

OTHER PUBLICATIONS

Japanese Office Action dated Jun. 13, 2006.

(Continued)

*Primary Examiner*—Martin Lerner
(74) *Attorney, Agent, or Firm*—Staas & Halsey LLP (57) ABSTRACT

Disclosed is a voice registration method for voice recognition, comprising the steps of analyzing a spectrum of a sound signal inputted from the outside; extracting predetermined language units for a speaker recognition from a voice signal in the sound signal; measuring the loudness of each language unit; collecting voice data on registered (background) speakers including loudness data of the plurality of background speakers as a reference onto voice database; determining whether the loudness of each language unit is within a predetermined loudness range based on the voice data base; learning each language unit by using a multi-layer perceptron in the case that at least a predetermined number of language units are within the predetermined loudness range; and storing data on the learned language unit as data for recognizing the speaker. With this configuration, loudness of a speaker is considered at learning for registering his/her voice and at verifying a speaker.

33 Claims, 7 Drawing Sheets

U.S. PATENT DOCUMENTS

| | | | |
|---|---|---|---|
| 4,593,403 A * | 6/1986 | Kishi et al. | 704/243 |
| 4,783,802 A * | 11/1988 | Takebayashi et al. | 704/243 |
| 4,980,918 A * | 12/1990 | Bahl et al. | 704/240 |
| 5,097,509 A * | 3/1992 | Lennig | 704/240 |
| 5,222,146 A * | 6/1993 | Bahl et al. | 704/243 |
| 5,559,926 A * | 9/1996 | DeSimone | 704/243 |
| 5,657,424 A * | 8/1997 | Farrell et al. | 704/255 |
| 5,675,704 A * | 10/1997 | Juang et al. | 704/246 |
| 5,842,162 A * | 11/1998 | Fineberg | 704/233 |
| 5,864,815 A * | 1/1999 | Rozak et al. | 704/275 |
| 5,946,653 A * | 8/1999 | Campbell et al. | 704/243 |
| 5,949,886 A * | 9/1999 | Nevins et al. | 381/57 |
| 6,098,040 A * | 8/2000 | Petroni et al. | 704/234 |
| 6,199,041 B1 | 3/2001 | Liu et al. | 704/231 |
| 6,266,638 B1 * | 7/2001 | Stylianou | 704/266 |
| 6,314,396 B1 * | 11/2001 | Monkowski | 704/233 |
| 6,336,091 B1 * | 1/2002 | Polikaitis et al. | 704/233 |
| 6,343,269 B1 * | 1/2002 | Harada et al. | 704/243 |
| 6,539,350 B1 * | 3/2003 | Walker | 704/233 |
| 6,686,839 B2 * | 2/2004 | Lai et al. | 340/540 |
| 6,721,706 B1 * | 4/2004 | Strubbe et al. | 704/275 |
| 6,826,306 B1 * | 11/2004 | Lewis et al. | 382/187 |
| 6,879,953 B1 * | 4/2005 | Oishi et al. | 704/231 |
| 7,243,068 B2 * | 7/2007 | Barker et al. | 704/233 |
| 2002/0173957 A1 * | 11/2002 | Kawane et al. | 704/234 |

FOREIGN PATENT DOCUMENTS

| | | |
|---|---|---|
| JP | 62-294299 | 12/1987 |
| JP | 2000-155595 | 6/2000 |
| JP | 2000-155600 | 6/2000 |
| JP | 2000-163092 | 6/2000 |

OTHER PUBLICATIONS

European Search Report issued Sep. 28, 2005.

* cited by examiner

MinNSD : MINIMUM SOUND DURATION
MaxNSD : MAXIMUM NON-SOUND DURATION

FIG. 6

VOICE REGISTRATION METHOD AND SYSTEM, AND VOICE RECOGNITION METHOD AND SYSTEM BASED ON VOICE REGISTRATION METHOD AND SYSTEM

FIELD OF THE INVENTION

The present invention relates to in general a voice recognition method and system based on the voice registration method and system, which prevent an error due to the loudness of speaker's voice by performing voice learning and voice recognition in consideration of the loudness of speaker's voice.

BACKGROUND ART

Generally, a security system has been mostly used for a national security and an industrial security, but is recently used for a personal security and a computer security.

Especially, the development of computer network systems including Internet has brought the problem that a computer network system becomes increasingly vulnerable to attack and therefore individual information is likely to leak out through networking such as electronic commerce, the Internet, etc.

To prevent the problem, in the case of a computer system, there have been developed several methods for allowing only a specified person to access to the computer system. The methods may be classified into a method using an ID, a password, a certification key, etc. and a method using a biological property. The biological property is comprised of a voice, a fingerprint, lines of a finger or a palm, a retinal pattern, etc.

The voice is a universal and simple means to express a human's intention. As technologies using the voice, there have been proposed a voice recognition system for perceiving the voice, a speaker recognition system for recognizing a speaker uttering the voice, etc.

In the speaker recognition system, a user does not need to use an ID and a password to prevent an illegal use. Further, only a sound card and a microphone, which are generally provided in a personal computer system, are adequate to perform the speaker recognition system. Furthermore, in the speaker recognition system, the personal computer system can be controlled to operate in response to the voice of a specified person.

The speaker recognition may be classified into speaker identification and speaker verification in terms of a recognition method. The speaker identification is to identify a speaker of an inputted voice, and the speaker verification is to accept or reject a speaker by verifying the voice of the speaker.

A general process of the speaker recognition will be described as follows.

First, if a speaker inputs his/her voice to a speaker recognition system in order to register himself/herself, a waveform of the inputted voice signal is represented as a spectrum. The spectrum is analyzed so as to pick out an isolated word, thereby sampling phonemes from the word. Herein, the phonemes are predetermined so as to be employed as a reference for recognizing the voice. Thereafter, the speaker recognition system makes a pattern for each phoneme of a speaker, and subsequently compares it with patterns of the predetermined phonemes, thereby learning the speaker's characteristics. If the learning is completed, the speaker's pattern is registered.

Later on, if a voice is newly inputted to the speaker recognition system, the speaker recognition system makes a pattern based on the new-inputted voice through the above analyzing process, and subsequently compares it with the voice pattern of the registered(background) speaker, thereby accepting or rejecting the speaker.

In the conventional speaker recognition system, a new-made pattern is compared to the voice pattern of the registered speaker stored in a database. However, the voice stored in the database is recorded under ideal conditions such as little noise, a highly efficient microphone, the uniform loudness of voice, etc., and therefore the voice stored in the database indicates only a special example of the actual voice.

In the case of inputting the voice uttered in the conditions different from the voice stored in the database, the performance of the voice recognition system is influenced. Particularly, the loudness of voice makes a significant influence on the performance of the system.

Thus, in the voice recognition system, it is necessary to provide voice learning and speaker verification in consideration of the influence of the loudness of voice.

DISCLOSURE OF INVENTION

Accordingly, the present invention has been made keeping in mind the above-described shortcoming and user's need, and an object of the present invention is to provide a voice registration method and system, and a voice recognition method and system based on the voice registration method and system, which accurately verifies a speaker by performing voice learning and speaker verification in consideration of the loudness of voice.

This and other objects of the present invention may be accomplished by the provision of a voice registration method for voice recognition, comprising the steps of analyzing a spectrum of a sound signal inputted from the outside; extracting predetermined language units for a speaker recognition from a voice signal in the sound signal; measuring the loudness of each language unit; collecting voice data on registered (background) speakers including loudness data of the plurality of background speakers as a reference onto voice database; determining whether the loudness of each language unit is within a predetermined loudness range based on the voice data base; learning each language unit by using a multi-layer perceptron in the case that at least a predetermined number of language units are within the predetermined loudness range; and storing data on the learned language unit as data for recognizing the speaker.

Preferably, the voice analyzing step includes the steps of representing the voice signal of the speaker as a spectrum; and compressing the spectrum by uniformly allocating filter banks to a speaker recognition region in which a voice characteristics of the speaker is to be recognized.

Preferably, the speaker recognition region is 0~3 KHz in which the filter banks are uniformly allocated, whereas over 3 KHz the intervals of the filter banks become logarithmically increased.

Preferably, the method further comprises the step of employing a plurality of phonemes selected from nasals, vowels, and approximants which include relatively lots of continuous sound as the language units, wherein the language unit extracting step includes the steps of making a plurality of frames by dividing the spectrum into several parts, and extracting a frame having the language unit among the frames.

Preferably, the loudness measuring step is comprised of calculating an energy value of the frame having the language unit of the spectrum.

Preferably, the method further comprises the step of extracting maximum and minimum loudness by analyzing the voice spectrum of the background speakers stored in the voice database and by calculating the energy value of the frame having the language unit, wherein the loudness determining step is comprised of determining whether the number of the frames having the loudness within the maximum and minimum loudness occupies a predetermined rate or more.

Preferably, the method further comprises the steps of forming a plurality of reference patterns to every language unit of the plurality of background speakers, and forming a plurality of speaker patterns to every language unit of the plurality of speakers, wherein the learning step includes the step of learning a pattern characteristics of the speaker by comparing the reference patterns with the speaker patterns according to a back-propagation algorithm.

Preferably, the method further comprises the step of making learning groups as many as the number of language units of the background speakers by employing the plurality of reference patterns to every language unit of one background speaker as a learning group, wherein the learning step is comprised of learning the pattern characteristics of the speaker by comparing the reference patterns of every learning group with the plurality of the speaker patterns.

Preferably, the storing step is comprised of storing the plurality of speaker patterns of every language unit and the loudness of every language unit as a speaker recognition data.

Preferably, the method further comprises the step of requesting the speaker to re-utter in the case that at least the predetermined number of language units are not within the predetermined loudness range.

According to another embodiment of the present invention, the above and other objects may be also achieved by the provision of a speaker recognition method for recognizing whether a speaker is a registered speaker, comprising the steps of analyzing a spectrum of a sound signal inputted from the outside; extracting predetermined language units for a speaker recognition from a voice signal in the sound signal; measuring the loudness of each language unit; determining whether the loudness of each language unit is within a predetermined loudness range; calculating a speaker score by calculating the probability that the language unit will belong to the speaker through a multi-layer perceptron, and by averaging the probability, in the case that at least a predetermined number of language units are within the predetermined loudness range; and verifying that the speaker is registered when the speaker score is beyond a threshold value by comparing the calculated speaker score with the predetermined threshold value which is a predetermined minimum speaker score for verifying the registered speaker.

Preferably, the speaker score can be calculated from the following equation $$Score_{speaker} = \frac{1}{M} \sum_{i=0}^{M-1} P(LU_i)$$

where $P(LU_i)$ is a score of the probability that the enquiring speaker is the background speaker of an $i^{th}$ language unit frame, and M is the number of language unit frame extracted from an isolated word.

Further, the speaker score can be calculated on the basis of weight of the language units given according to verifiability.

According to another aspect of the present invention, the above and other objects may be also achieved by the provision of a voice recognition system for voice recognition, comprising a voice analyzer analyzing a spectrum of a sound signal inputted from the outside; a voice extractor extracting a voice signal from the sound signal and extracting predetermined language units for recognizing a speaker from the voice signal; voice database storing therein background speaker voice data including the loudness of a plurality of reference background speakers; a loudness determiner determining the loudness of each language unit, and determining whether the loudness of each language unit is within a predetermined loudness range on the basis of the voice database; a learner learning the language unit in the case that at least the predetermined number more of the language units are within the predetermined loudness range; a memory storing data on the learned language units as recognition data for the speaker; and a controller controlling operations of the voice analyzer, the voice extractor, the loudness determiner and the learner when a voice is inputted, and storing the recognition data for the speaker in the memory.

According to another embodiment of the present invention, the above and other objects may be also achieved by the provision of a speaker recognition method for recognizing whether a speaker is a registered speaker, comprising a voice analyzer analyzing a spectrum of a voice signal inputted from external sound signals; a voice extractor picking out voice signals among inputted sound and abstracting predetermined language units for recognizing the speaker from the voice signals; a loudness determiner determining the loudness of each language unit, and determining whether the loudness of each language unit is within a predetermined loudness range; a speaker score calculator calculating a speaker score by calculating probability of that the language unit will belong to the speaker, and by averaging the probability; and a controller controlling the speaker score calculator to calculate the speaker score in the case that at least the predetermined number more among all language units is within the predetermined loudness range, and ascertaining that the speaker has been registered when the speaker score is beyond a threshold value by comparing the calculated speaker score with the predetermined threshold value which is a predetermined minimum speaker score for ascertaining the registered speaker.

BRIEF DESCRIPTION OF DRAWINGS

The present invention will be better understood and its various objects and advantages will be more fully appreciated from the following description taken in conjunction with the accompanying drawings, in which.

MODES FOR CARRYING OUT THE INVENTION

Hereinafter, the present invention will be described in more detail with reference to the accompanying drawings.

In a voice recognition system according to the present invention, an MLP (Multi-Layer Perceptron) for sampling continuants and verifying a speaker is independently used or used together with an HMM (Hidden Markov Model) in time of a voice recognition. The advantage of the MLP is that it is possible to learn to reject a competitive group; preliminary data on statistical characteristics of voice are unnecessary; and it is easy to embody the MLP in hardware on account of high degree of a parallel computation and regularity.

In the present invention, the MLP is used for verifying a speaker. Hereinbelow, in order to show that the MLP is used in verifying a speaker, a stochastic method for verifying the speaker will be described first, and then it will be described that an operation of the MLP is based on the stochastic method.

In the speaker verification, uttering of voice is defined as a sample O which is an observed queue generated by a voice model M(S) related to a speaker S. The relation of the inputted sample O and the voice model M(S) is expressed as a posteriori probability P(M(S)|O). A verification process V(S) is performed by comparing the posteriori probability P(M(S)|O) with a predetermined threshold value θ.

$$V(S) = \begin{cases} \text{reject}, & P(M(S)|O) < \theta \\ \text{accept}, & P(M(S)|O) \geq \theta \end{cases} \quad \text{[Equation 1]}$$

Equation 1 shows that the speaker is rejected and accepted when the posteriori probability is lower than and higher than or equal to the threshold value θ, respectively.

Using Bayes' rule, a posteriori probability P(M(S)|O) can be written as.

$$P(M(S)|O) = \frac{P(O|M(S))P(M(S))}{P(O)} \quad \text{[Equation 2]}$$

Herein, because the speaker to be verified belongs to not a closed set is but an open set, it is impossible to calculate accurately not only the posteriori probability P(M(S)|O) which is a fixed value in a closed set but also P(O) which is an evidence of the speaker.

$$P(O) = \sum_{i}^{\infty} P(O|M(S_i))P(M(S_i)) \quad \text{[Equation 3]}$$

Thus, under the condition of the uncertain P(M(S)) and P(O), P(O|M(S)) cannot be used in calculating a posteriori probability.

To solve the above problem, there has been proposed a method which average the P(O|M(S)) through a comparison with other speakers, i.e., a similarity score of the enquiring speaker is averaged under a similarity score of registered (background) speakers. A similarity ratio due to the comparison between the speaker and the background speakers can be expressed as follows.

$$L(O) = \frac{P(O|M(S_i))}{P(O|M(S_{bg,i \notin bg}))} \quad \text{[Equation 4]}$$

Where L(O) is the similarity ratio, P(O|M(S_i)) is a likelihood probability of the enquiring speaker, and P(O|M(S)) is a likelihood probability of the background speaker.

Using the above method, the posteriori probability P(M(S)|O) is estimated by approximately calculating Equation 3 when the background speaker set is sufficiently great to represent every enquiring speaker.

On the other hand, according to researches of Gish, the MLP embodies the above mathematical model.

Assuming that the MLP is function of x and θ, in which x is an input feature vector and θ is a parameter defining the MLP, let a a target output when x belongs to $C_{enr}$ of the enquiring speaker, and b a target output when x belongs to $C_{bg}$ of the background speaker. A reference for estimating efficiency of the MLP can be expressed as follows with an average squared error.

$$E = \frac{1}{N}\left[\sum_{x \in C_{enr}}[f(x,\theta)-a]^2 + \sum_{x \in C_{bg}}[f(x,\theta)-b]^2\right] \quad \text{[Equation 5]}$$

Where N is the number of the samples for learning.

Thus, if N is sufficiently large, and the number of the samples of both the speaker sets is given by a priori probability of set distribution, then the above summation can be approximated as follows.

$$E \approx \int [f(x,\theta)-a]^2 p(x,C_{enr})dx + \int [f(x,\theta)-b]^2 p(x,C_{bg})dx \quad \text{[Equation 6]}$$

Where p(x,C) is a density function of a joint probability of an observation result and an observation speaker set.

$$p(x) = p(x, C_{enr}) + p(x, C_{bg}) \quad \text{[Equation 7]}$$
$$d(x) = \frac{p(x, C_{enr}) + p(x, C_{bg})}{p(x)}$$
$$= aP(C_{enr}|x) + bP(C_{bg}|x)$$

Using Equation 7, the Equation 6 leads to $$E = \int [f(x,\theta)-d(x)]^2 p(x)dx + a^2 P(C_{enr}) + b^2 P(C_{bg}) - \int d^2(x)p(x)dx \quad \text{[Equation 8]}$$

In Equation 8, only the first term includes the parameter related to the MLP. Therefore, in order to minimize E, varying the parameters of f(x,θ) is the same as minimizing the average squared error between an output of the MLP and the target probability d(x).

In learning, if vector [0 1] or [1 0] is substituted for a and b for the sake of a target output of the MLP, Equation 7 is expressed as Equation 9. It means that the posteriori probability of one between both the speaker sets is selected for the sake of the target output of the MLP.

$$d(x) = P(C_{enr}|x) \text{ or } P(C_{bg}|x) \quad \text{[Equation 9]}$$

That is, according to Equation 8, the MLP learns to approach the selected posteriori probability on the basis of the average squared error. To validate this mention, the average squared error must be lowered, and to lower the average squared error, the MLP must have a proper structure.

Hereinbelow, it will be shown that an operation of the MLP includes the process of leveling off the posteriori probability. The output of the MLP is expressed as follows with a sigmoid function.

$$f(x, \theta) = \frac{1}{1 + e^{-z(x,\theta)}} \qquad \text{[Equation 10]}$$

where the $Z(x,\theta)$ is an input of the sigmoid function in an output layer.

An inverse function of Equation 10 can be expressed as follows $$z(x, \theta) = \log\frac{f(x, \theta)}{1 - f(x, \theta)} \qquad \text{[Equation 11]}$$

Further, for the enquiring speaker, if the output of the MLP is defined as the posteriori probability, $$f(x,\theta) = P(C_{enr}|x) \qquad \text{[Equation 12]}$$

then, the Equation 11 can be rewritten as follows.

$$\begin{aligned}z(x, \theta) &= \log\frac{P(C_{enr}|x)}{1 - P(C_{enr}|x)} \\ &= \log\frac{P(C_{enr}|x)}{P(C_{bg}|x)} \\ &= \log\frac{P(x|C_{enr})}{P(x|C_{bg})} + \log\frac{P(C_{enr})}{P(C_{bg})}\end{aligned} \qquad \text{[Equation 13]}$$

As a result, the similarity ratio of Equation 6 can be expressed through the MLP. That is, because the similarity ratio can be applied in the MLP, the posteriori probability P(M(S)|O) can be estimated from Equation 3 by an approximation. Therefore, using the posteriori probability, the speaker verification is possible in the open set through the MLP with the similarity ratio.

On the other hand, the voice recognition system according to the present invention employing the MLP will be described herein below.

Figure 1:
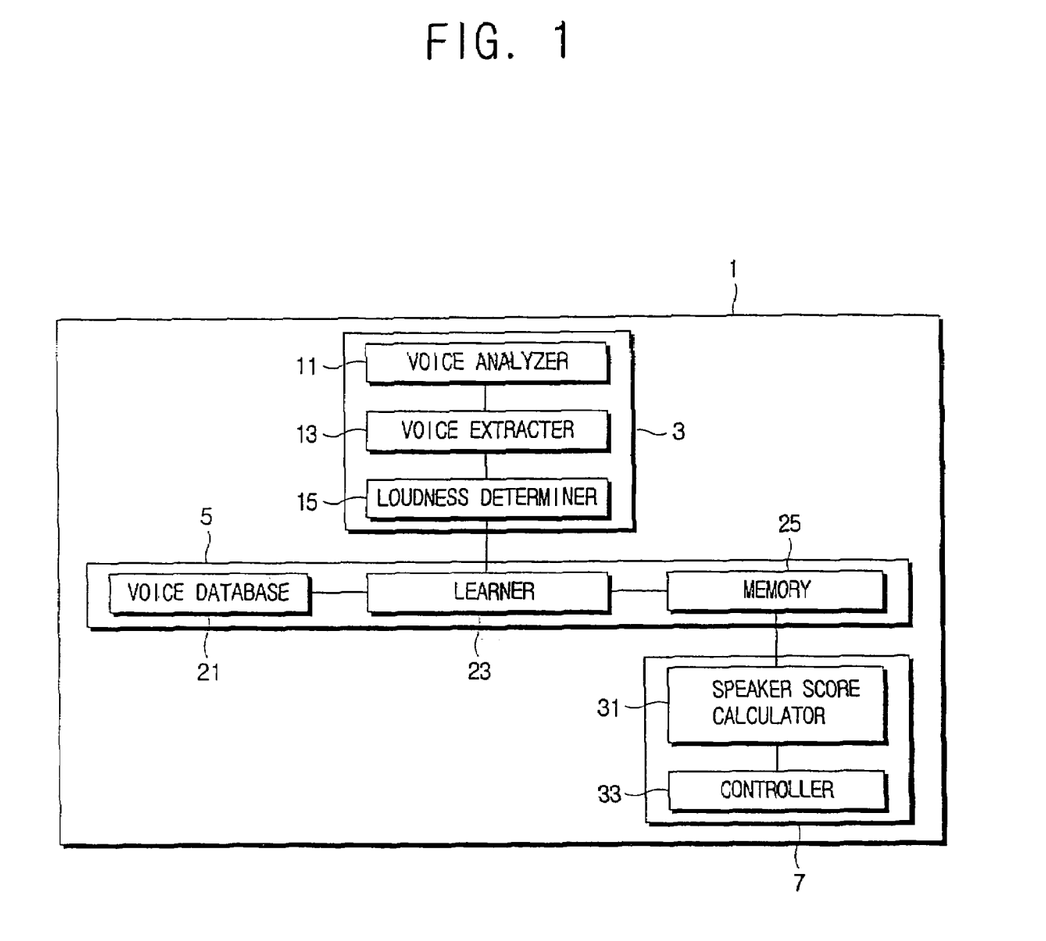
FIG. 1 is a block diagram of a voice recognition system according to the present invention.

As shown in FIG. 1, the voice recognition system 1 according to the present invention comprises a learning part 5 for learning preceding the speaker registration, a speaker verification part 7 for verifying the speaker, and an analysis part 3 commonly used for the speaker registration and verification.

The analysis part 3 includes a voice analyzer 11 for analyzing a voice signal of a speaker, a voice extractor 13 extracting a voice signal among inputted sound and extracting predetermined language units for recognizing the speaker, a loudness determiner 15 determining the loudness of each language unit and measuring whether the loudness of each language unit is within a predetermined loudness range.

The learning part 5 includes a learner 23 learning about the language units in the case that some of the language units are within the predetermined loudness range, a memory 25 storing data on the learned language units for the speaker recognition, and a voice database 21 in which the loudness and a voice characteristics of the background speakers to be compared with the enquiring speaker are stored.

The speaker verification part 7 includes a speaker score calculator 31 calculating the probability of that the language unit will belong to the speaker through the MLP in the case that some of the language units are within the predetermined loudness range and then calculating the speaker score through the average of the probability, and a controller 33 comparing the calculated speaker score with the predetermined threshold value and verifying that the speaker has been registered when the speaker score is beyond the threshold value.

However, because voice signals are nonlinear, speaker recognition efficiency is not perfect. The speaker recognition rate according to resonance frequency bands of the voice signal has been measured by Cristea et al. As the result of the measurement, in the case of the voice recognition for understanding the meaning of the voice, the recognition rate was greater than 80% at 0.3 KHz~2 KHz, whereas in the speaker recognition for identifying the voice to whom belongs, the recognition rate was greater than 80% at 1.5 KHz~2.7 KHz. According to the result, Criatea et. al has improved the speaker recognition rate by narrowing filter banks at 1.5 KHz~2.5 KHz in comparison with 0~1.5 KHz.

Figure 2:
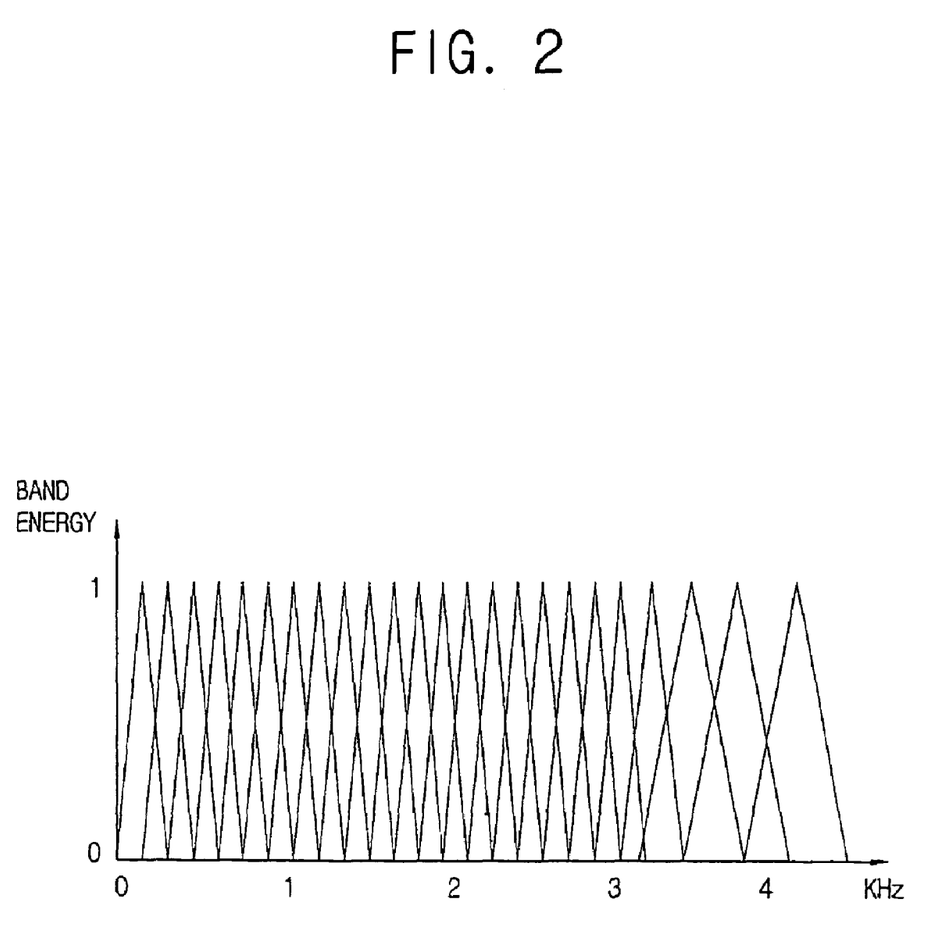
FIG. 2 is a graph showing a filter bank of the voice recognition system according to the present invention.

As shown in FIG. 2, according to the present invention, in compressing the spectrum, intervals of the filter banks are uniform at 0~3 KHz, whereas the intervals of the filter banks become increase logarithmically over 3 KHz. At this time, two-third out of fifty filter banks, about thirty-three are allocated to 0~3 KHz, and the other filter banks are logarithmically allocated over 3 KHz.

The present inventor ascertained that the above filter bank allocation method is more efficient than the Criatea et. al method in the speaker recognition efficiency. Hereinbelow, it will be demonstrated by a middle distance between speakers expressed as Equation 1-1, and degree of variance between speaker sets expressed as Equation 1-2.

$$\text{Dist}_{i,j} = |m_i - m_j| \qquad \text{[Equation 1-1]}$$

$$J_{i,j} = \frac{\text{Dist}_{i,j}^2}{\text{Var}_i + \text{Var}_j} \qquad \text{[Equation 1-2]}$$

Figure 3:
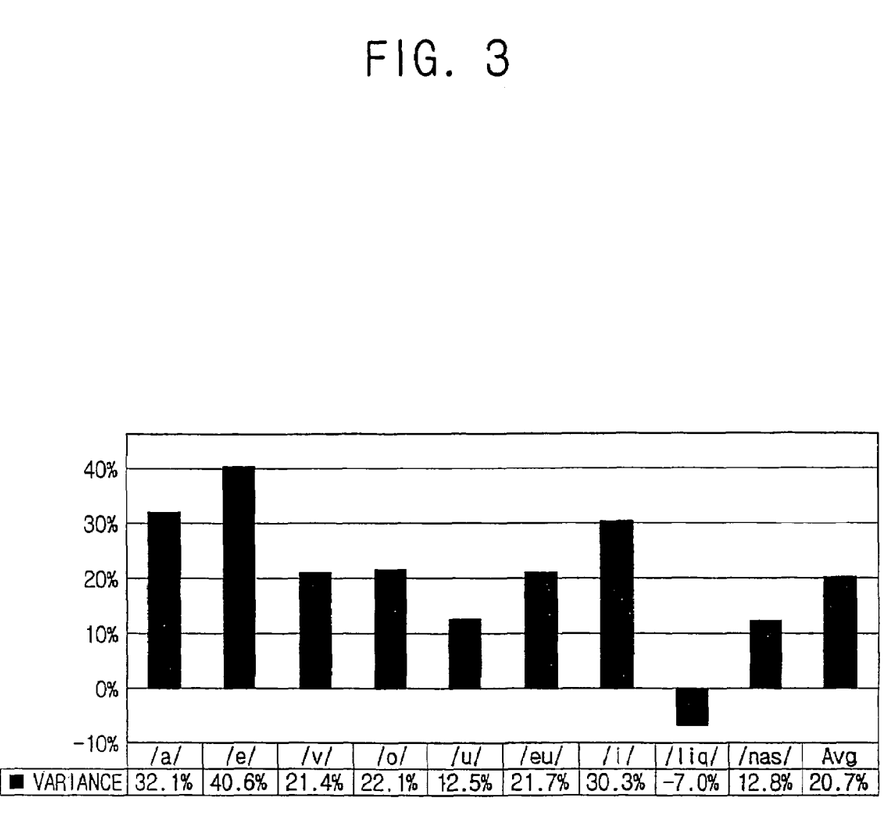
FIG. 3 is a graph showing a rate of middle distance variation between registered speakers according to the filter bank allocation of FIG. 2.
Figure 4:
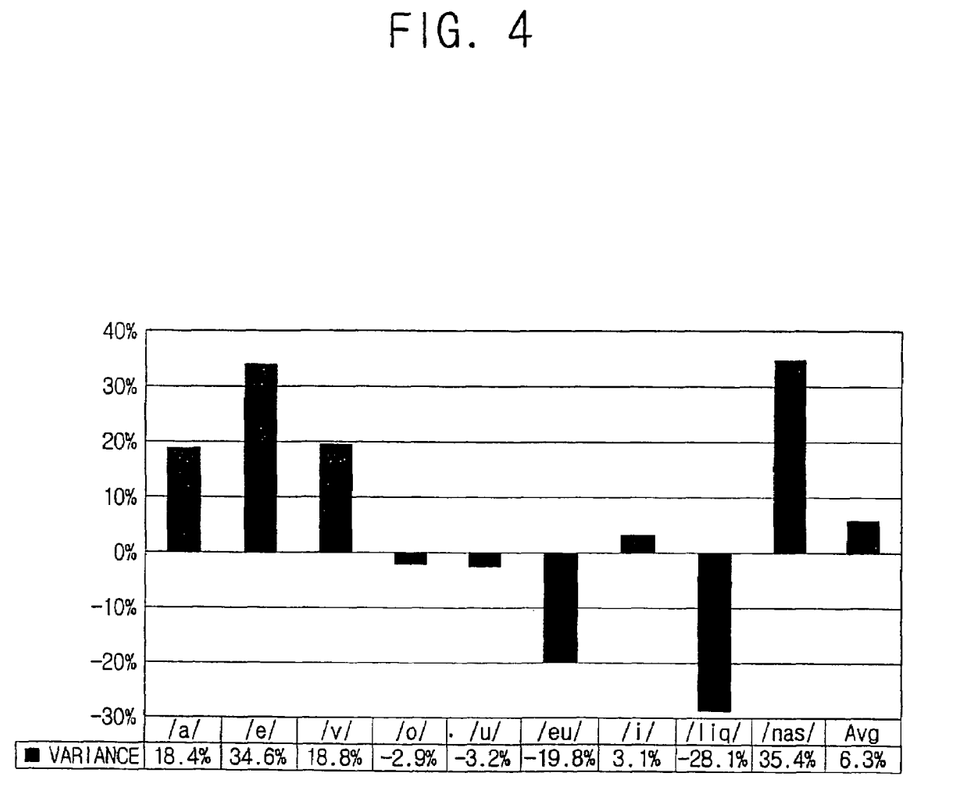
FIG. 4 is a graph showing variance degree of the registered speakers according to the filter bank allocation of FIG. 2.

As the result of the middle distance between speakers and the degree of variance between speaker sets which are respectively derived from Equations 1-1 and 1-2, if the filter banks are allocated according to the present invention in comparison with the Cristea et. al method, the middle distance between speakers of each language unit is, as shown in FIG. 3, 20.7% distant on the average, and the degree of variance between speaker sets of each language unit is, as shown in FIG. 4, 6.3% lowered on the average. Generally, the classification efficiency of the language unit increases in proportion to the middle distance between speakers and to decrease in the degree of variance of the speaker set, and thus, as shown in FIGS. 3 and 4, both the middle distance between speakers and the degree of variance of the speaker set are improved according to the present invention.

As described above, in the voice recognition system according to the present invention, the voice analyzer 11 compresses the spectrum in the state that intervals of the filter banks are uniform at 0~3 KHz, whereas the intervals of the filter banks become logarithmically increased over 3 KHz. Further, the voice analyzer 11 divides the inputted voice signal by a predetermined frame before compressing the spectrum, and then extracts the spectrum of each frames.

According to the present invention, the language units are selected from nasals, vowels, and approximants, which include relatively lots of continuous sound, and thus total nine phonemes, /a/, /e/, /v/, /o/, /u/, /eu/, /i/, /liq/, /nas/, are employed as the language units. Hereinafter, the above language units having lots of continuous sound will be called as continuants.

The voice extractor 13 extracts mutes, the continuants, and voiceless sound from the compressed spectrum, and detects an isolated word. The isolated word is the unit of a language necessary for the speaker recognition, e.g., a phrase, a word, a syllable, a phoneme, etc. The voice extractor 13 classifies the frames detected by the voice analyzer 11 into eleven types of the mute, the nine continuants, and the voiceless sound through a TDNN (Time-Delay Neural Network), and then applies a result from the TDNN and energy of each frame to an algorithm for detecting the isolated word. Herein, the TDNN additionally includes a time-delay term in comparison with the MLP.

Figure 5:
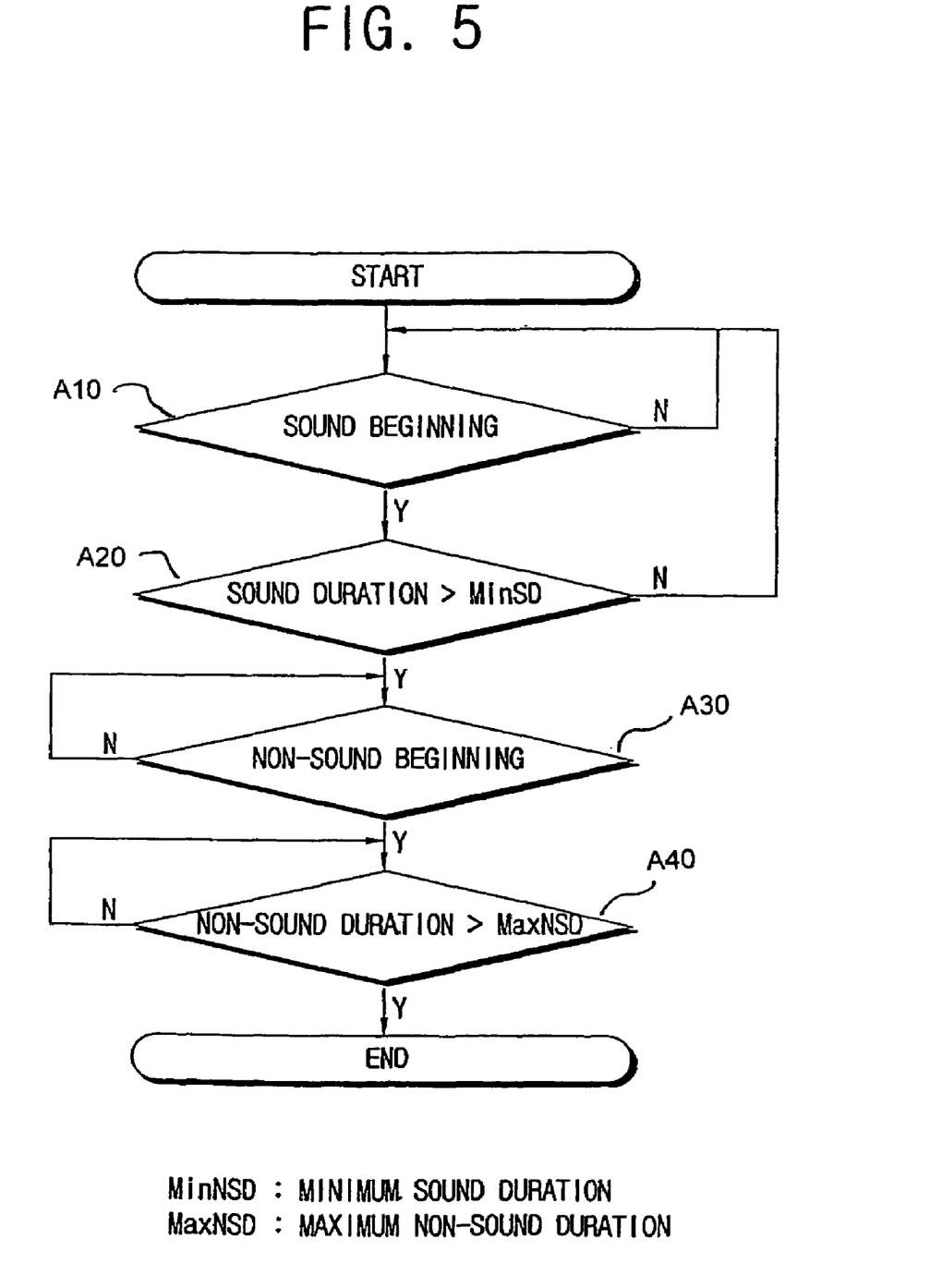
FIG. 5 is a flow chart showing the process of picking out an isolated word in the voice recognition system according to the present invention.

Hereinbelow, the process of detecting the isolated word will be described with reference to FIG. 5.

First, if sound is begun (A10), then it is determined whether a sound duration is over a MinSD (Minimum Sound Duration) (A20). The MinSD is employed as a reference for detecting the isolated word. If the sound duration is not over the MinSD, the beginning of the utterance is redetected, whereas if the sound duration is over the MinSD, it is detected whether non-sound is begun (A30). At this time, if the non-sound is begun, it is determined whether a non-sound duration is over a MaxNSD (Maximum Non-Sound Duration) (A40). If the non-sound duration is over a MaxNSD, the process for detecting the isolated word is stopped.

According as the isolated word is detected, the frame including the continuants can be abstracted from the isolated word through the TDNN. One frame may include only one continuant or a plurality of continuants. Thereafter, the frame including the continuants is reanalyzed, and thus can be used as speaker patterns of each continuant for the speaker recognition and the speaker verification.

On the other hand, according as the frame including the continuants is extracted, the loudness determiner 15 calculates an energy value of the continuant spectrum, and determines the loudness thereof. Further, the loudness determiner 15 determines whether the loudness of the enquiring speaker can be used in the speaker registration as compared with the loudness of the background speaker previously stored in the voice database 21.

The voice database 21 is a collection of data on the voices of a large number of the background speakers to be compared with the enquiring speakers, and in which the maximum and minimum loudness of each continuant of the background speakers are previously stored. At this time, the loudness of every continuant of each background speaker can be calculated with the energy value of every continuant, and expressed as follows.

$$\text{Loud}(p, n) = \frac{1}{M} \sum_{i=0}^{M-1} |S(M \cdot n + i)| \qquad \text{[Equation 1-3]}$$

Where S is a voice sample, P is a continuant, M is the number of voice sample in the frame, and N is a frame number.

Using Equation 1-3, it is determined whether the enquiring speaker's frame including the continuants is between the maximum and minimum loudness of the background speakers. At this time, the frame including the continuants can be registered by two methods. One is that without respect to total frame of the isolated words extracted from the enquiring speaker's voice, only the frames which are between the maximum and minimum loudness of the background speakers are admitted to be registered. The other one is that if the frames which are between the maximum and minimum loudness of the background speakers are over the predetermined percentage, the frames are admitted to be registered. Generally, because the continuants of a long word are uttered by a different loudness according to accent and grammar, the latter method considering an average loudness of total frames of the isolated word is desirable.

On the other hand, the voice database 21 used in the present invention is jointly researched for an efficiency test by Korea Institute of Technology and Kwangwoon University. The voice database 21 has an utterance catalog including a single numeral, a demonstrative word, a four series numeral, a short sentence, and a PBW (phone-balanced word). According to the present invention, the PBW and the four series numeral are used in the TDNN for recognizing the continuants and the MLP for verifying the speakers, respectively.

In the case that the frame including the continuants is admitted to be registered by determining the loudness, the voice extractor 13 forms a plurality of speaker patterns corresponding to each language unit of a speaker. The speaker patterns corresponding to each language unit of the background speakers are previously stored in the voice database 21.

To register a speaker, a template for a registration word corresponding to the isolated word is formed and stored, and the learning according to the continuants is performed by the MLP. In order to store the registration word by a template as a unit, 2-3 templates must be needed for one word. Thus, the enquiring speaker must utter the same word several times at the time of the speaker registration.

In the conventional learning of the continuants for the speaker registration, the enquiring speaker patterns are learned for every background speaker pattern, and that is called an epoch. In the case of learning a reference pattern by one epoch, because a learning suspension reference is applied to every background speaker, discrimination rate between the enquiring speaker and the background speaker having a pattern similar to the enquiring speaker is lowered. Herein, the learning suspension reference is a predetermined priori changing rate. The predetermined priori changing rate is an average squared error rate employed as a reference for determining whether or not the learning through the MLP is sufficient, and determined by experimentation. The average squared error rate expresses the range of an error occurred between the background speakers.

That is, if the average squared error rate approaches the predetermined priori changing rate in the course of learning by comparing the enquiring speaker with the background speaker, the learner 23 suspends the learning. However, because the priori fixing rate is only an experimental value, there may be possible that the background speaker has the error occurrence range being smaller than the priori changing rate. Therefore, when the range, of an error occurred between the background speaker and the enquiring speaker is smaller than the priori fixing rate, the verifiability is lowered, thereby increasing a false acceptance (FA) rate. The false acceptance rate expresses the rate of falsely accepting a non-registered speaker, and if a system accepts the non-registered speaker, information of the system is likely to leak out by an impostor, so that the false acceptance must be decreased.

According to the present invention, in order to correctly learn the speaker characteristics, a plurality of reference patterns formed according to each continuant of one background speaker is employed as one learning group. Thus, because each continuant forms the learning group, every background speaker has the plurality of learning groups, respectively. That is, in the case that one background speaker has nine continuants and each continuant has ten reference patterns, one background speaker has nine learning groups respectively including ten reference patterns.

Using the MLP, the learner 23 compares the reference patterns of every background speaker with the plurality of patterns of the enquiring speaker, and learns the pattern property of the enquiring speaker according to a back-propagation algorithm. Herein, because the one learning by comparing the reference patterns of every background speaker with the plurality of patterns of the enquiring speaker was called the epoch, a one learning by comparing one of the learning groups of the background speaker with one of the patterns of the enquiring speaker will be called a sub-epoch.

Therefore, the pattern of the enquiring speaker goes through a plurality of sub-epochs against the reference patterns of the background speaker. Going through the plurality of sub-epochs, the reference patterns of every background speaker is compared with the patterns of the enquiring speaker. At this time, the more the reference pattern of the background speaker is similar to the patterns of the enquiring speaker, the more the learning is repeated. Thus, discrimination of the pattern between the enquiring speaker and the background speaker is increased.

Thereafter, the learned patterns are stored in the memory 25, and used as a reference value when the voice of the enquiring speaker is re-inputted.

On the other hand, the process of verifying a speaker will be described herein below. If the enquiring speaker inputs his/her voice, the loudness determiner 15 determines whether or not at least the predetermined number more among all language units of the isolated word is within the predetermined loudness range. If the inputted isolated word is not within the predetermined loudness range, the enquiring speaker is requested to re-input his/her voice. Oppositely, if the inputted isolated word is within the predetermined loudness range, it is determined through a DTW (Dynamic Time Warping) algorithm whether or not the isolated word and the registration word template are identical each other. Then, in the case that the inputted isolated word and the stored registration word template are identical each other, the speaker score is calculated by inputting the learned speaker pattern of the continuants abstracted by the MLP. The speaker score is derived from Equation 1-4.

$$\text{Score}_{speaker} = \frac{1}{M} \sum_{i=0}^{M-1} P(LU_i) \qquad \text{[Equation 1-4]}$$

Where $P(LU_i)$ is a probability score that the enquiring speaker is the background speaker of an $i^{th}$ language unit frame, and M is the number of language unit frame extracted from the isolated word.

The speaker score may be calculated by putting weighted value on the continuants of good discrimination.

Thereafter, the calculated speaker score is compared to the predetermined threshold value, and if the calculated speaker score is beyond the threshold value, the inputted voice is determined as the voice of a registered speaker, thereby accepting the voice. Herein, the threshold value is a minimum speaker score for verifying that the inputted voice is the voice of the registered speaker, and is determined as a value only minimizing a false rejection (FR) rate because the verification of the registration word is not important in the speaker verification. The false rejection rate expresses the rate of falsely rejecting the registered speaker.

Figure 6:
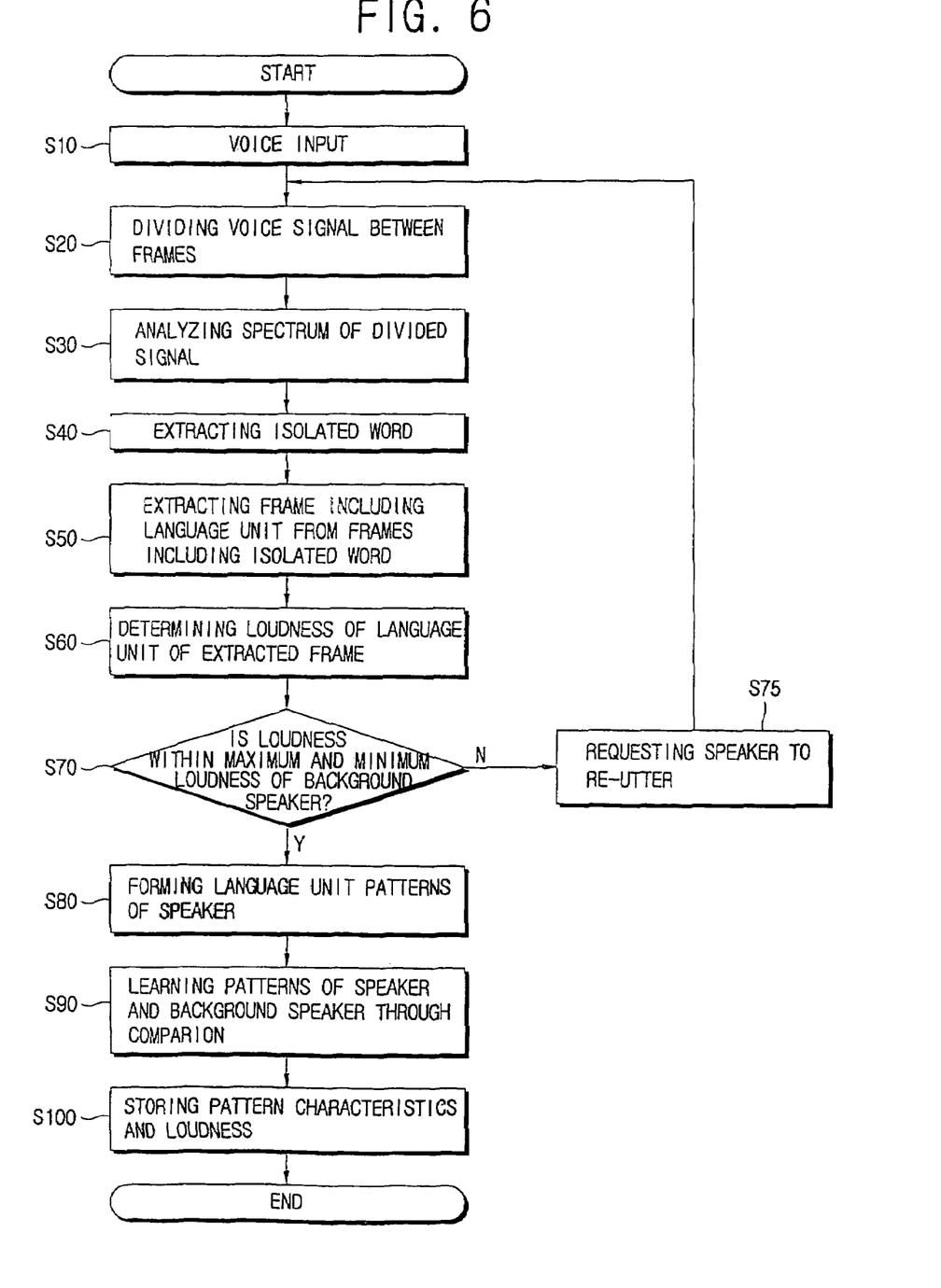
FIG. 6 is a flow chart showing the process of registering a voice in the voice recognition system according to the present invention.

With this configuration, in the voice recognition system 1 according to the present invention, the process of registering a voice will be described herein below with reference to FIG. 6.

First, if the enquiring speaker inputs his/her voice (S10), the voice analyzer 11 divides the inputted voice signal by a predetermined frame (S20), represents it as a spectrum (S30), and compresses the spectrum through the filter bank, thereby picking out the isolated word (S40). Then, the voice extractor 13 picks out the frame including the language unit among the frames of the isolated word (S50) The loudness determiner 15 determines the loudness of the language unit (S60), and determines whether or not the loudness is between the maximum and minimum loudness of the background speakers (S70). At this time, if the loudness of the enquiring speaker language unit is not between the maximum and minimum loudness of the background speakers, the controller 33 requests the enquiring speaker to re-input his/her voice (S75).

Oppositely, if the loudness of the enquiring speaker language unit is between the maximum and minimum loudness of the background speakers, the pattern of every language unit of the enquiring speaker is made (S80). Further, the learner 23 compares the reference patterns of every background speaker with the patterns of the enquiring speaker, and learns the pattern property of the enquiring speaker with the MLP (S90). Herein, the reference patterns of the background speaker are classified into the plurality of learning groups according to each language unit, and each patterns of the enquiring speaker is compared to the reference patterns of the background speakers according to the language unit. Then, if the learning is completed, the compared patterns and the loudness of the enquiring speaker are registered (S100).

Figure 7:
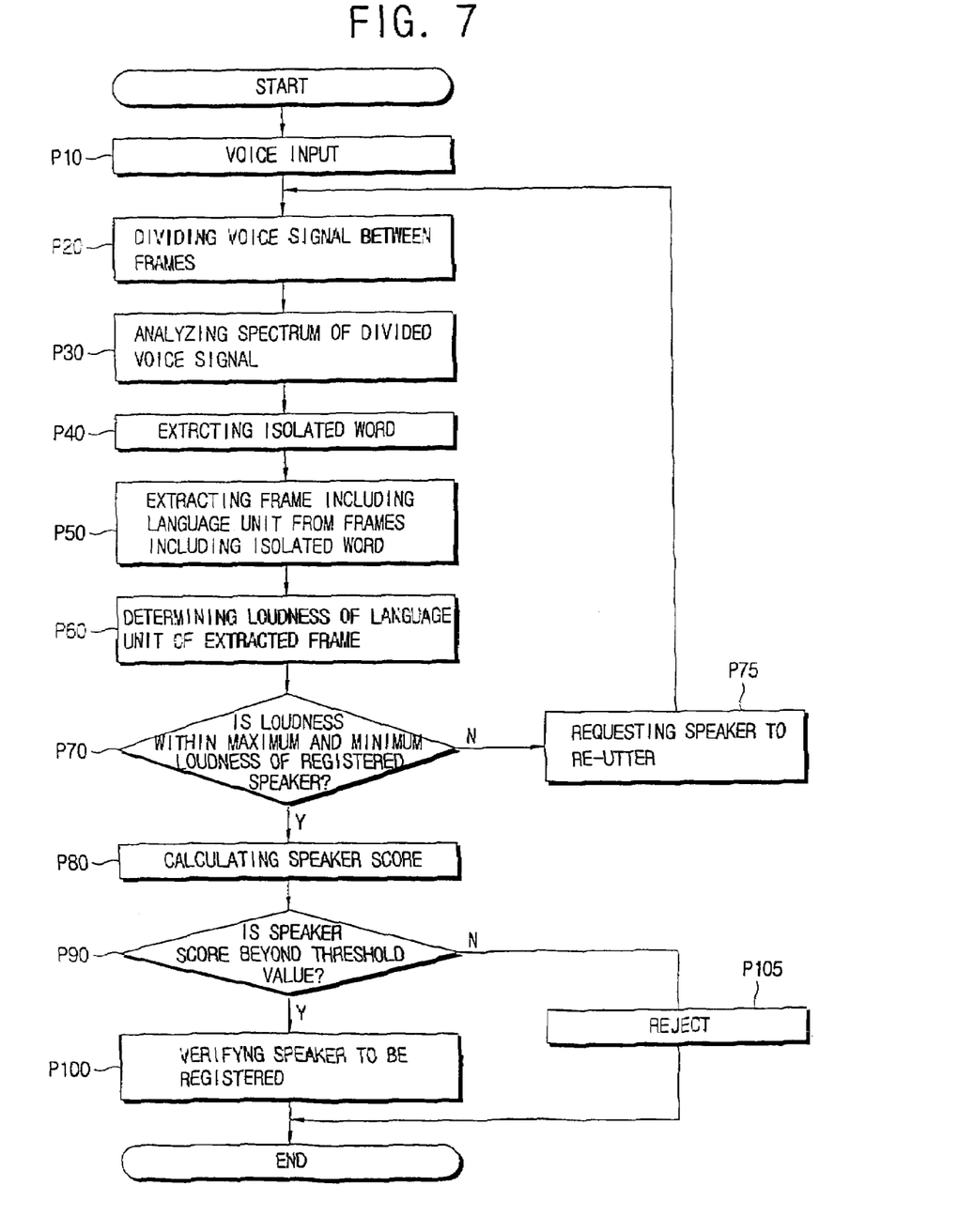
FIG. 7 is a flow chart showing the process of verifying a speaker in the voice recognition system according to the present invention.

Further, the process of the speaker verification verifying whether or not the voice of the enquiring speaker is the registered voice will be described herein below with reference to FIG. 7.

First, if the enquiring speaker inputs his/her voice (P10), the voice analyzer 11 divides the inputted voice signal by a predetermined frame (P20), represents it as a spectrum (P30), and picks out the isolated word (P40). Then, the voice extractor 13 picks out the frame including the language unit among the frames of the isolated word (P50). The loudness determiner 15 determines the loudness of the language unit (P60), and determines whether or not the loudness is between the maximum and minimum loudness of the background speakers (P70). At this time, if the loudness of the enquiring speaker language unit is not between the maximum and minimum loudness of the background speakers, the controller 33 requests the enquiring speaker to re-input his/her voice (P75), whereas, if the loudness of each language unit of the enquiring speaker is between the maximum and minimum loudness of the background speakers, the speaker score calculator 31 calculates the speaker score of every language unit with the MLP (P80). Thereafter, the controller 33 compares the calculated speaker score with the predetermined threshold value (P90), and verifying that the enquiring speaker has been registered when the speaker score is beyond the threshold value, thereby accepting the enquiring speaker (P100). Oppositely, in the case that the speaker score is below the threshold value, the controller 33 verifies that the enquiring speaker has not been registered, thereby rejecting the enquiring speaker (P105).

Hereinbelow, tables 4 through 6 show the result of the speaker registration using the voice recognition system 1 according to the present invention, in which the enquiring speaker respectively utters with 180%, 140%, 120%, 100%, 80% loudness after being respectively registered with 180%, 140%, 120%, 100%, 80% loudness. Tables 1 through 3 show the false reject, the false acceptance, and an isolated word acceptance in the conventional voice recognition system, respectively. Further, the tables 4 through 6 show the false reject, the false acceptance, and an isolated word acceptance according to the embodiments of the present invention. Herein, the false reject expresses the rate of falsely rejecting the registered speaker, and the isolated word acceptance expresses the rate of acceptance when the enquiring speaker utters the registration word of the background speaker.

TABLE 1

False reject in the conventional voice recognition system.

| Learning | Verification | | | | |
|---|---|---|---|---|---|
| | 180% | 140% | 120% | 100% | 80% |
| 180% | 0.78 | 7.67 | 24.02 | 71.23 | 47.29 |
| 140% | 1.28 | 1.79 | 4.67 | 34.71 | 19.24 |
| 120% | 3.58 | 2.21 | 2.80 | 17.53 | 12.67 |
| 100% | 30.91 | 20.86 | 14.23 | 2.79 | 34.59 |
| 80% | 11.64 | 8.49 | 9.95 | 34.74 | 3.59 |

TABLE 2

False acceptance in the conventional voice recognition system.

| Learning | Verification | | | | |
|---|---|---|---|---|---|
| | 180% | 140% | 120% | 100% | 80% |
| 180% | 25.17 | 12.47 | 7.38 | 2.41 | 6.99 |
| 140% | 19.19 | 12.11 | 8.82 | 3.39 | 8.26 |
| 120% | 14.13 | 10.26 | 8.26 | 3.95 | 7.34 |
| 100% | 3.91 | 2.97 | 2.79 | 2.79 | 2.49 |
| 80% | 14.45 | 10.61 | 8.17 | 3.47 | 12.91 |

TABLE 3

Isolated word acceptance in the conventional voice recognition system.

| Learning | Verification | | | | |
|---|---|---|---|---|---|
| | 180% | 140% | 120% | 100% | 80% |
| 180% | 99.73 | 99.52 | 99.19 | 99.45 | 97.19 |
| 140% | 99.70 | 99.71 | 99.38 | 99.73 | 99.67 |
| 120% | 99.62 | 99.67 | 99.34 | 99.71 | 97.67 |
| 100% | 99.40 | 99.55 | 99.26 | 99.68 | 97.53 |
| 80% | 98.89 | 99.02 | 98.82 | 99.14 | 96.86 |

TABLE 4

False reject in the voice recognition system according to the present invention.

| Learning | Verification | | | | |
|---|---|---|---|---|---|
| | 180% | 140% | 120% | 100% | 80% |
| 180% | 1.22 | 10.19 | 31.08 | 74.07 | 48.30 |
| 140% | 2.23 | 2.25 | 6.16 | 37.37 | 18.14 |
| 120% | 4.07 | 2.65 | 3.29 | 2.97 | 10.64 |

TABLE 4-continued

False reject in the voice recognition system according to the present invention.

| Learning | Verification | | | | |
|---|---|---|---|---|---|
| | 180% | 140% | 120% | 100% | 80% |
| 100% | 34.04 | 22.59 | 16.05 | 2.70 | 32.27 |
| 80% | 11.57 | 7.84 | 9.20 | 33.44 | 3.26 |

As shown in Table 4, the more the enquiring loudness is similar to the learning loudness, the more the false reject is decreased, whereas the more the enquiring loudness is different to the learning loudness, the more the false reject is increased. Particularly, the false reject becomes maximized in the case that the learning loudness is higher and the enquiring loudness is lower.

TABLE 5

False acceptance in the voice recognition system according to the present invention.

| Learning | Verification | | | | |
|---|---|---|---|---|---|
| | 180% | 140% | 120% | 100% | 80% |
| 180% | 23.16 | 12.08 | 7.35 | 2.41 | 7.26 |
| 140% | 17.08 | 11.58 | 8.23 | 3.19 | 8.98 |
| 120% | 12.72 | 9.72 | 7.72 | 8.46 | 8.15 |
| 100% | 3.35 | 2.75 | 2.56 | 2.71 | 2.61 |
| 80% | 13.38 | 10.05 | 7.66 | 3.26 | 11.85 |

As shown in Table 5, the false acceptance, which expresses the rate of falsely accepting the non-registered speaker, is minimized in the case of the 100% learning or enquiring loudness. In the other case, the false acceptance is increased. Compared with Table 2, the Table 5 shows that the false acceptance of the voice recognition system 1 according to the present invention is improved on the whole.

TABLE 6

Isolated word acceptance in the voice recognition system according to the present invention.

| Learning | Verification | | | | |
|---|---|---|---|---|---|
| | 180% | 140% | 120% | 100% | 80% |
| 180% | 46.41 | 56.89 | 59.32 | 60.44 | 58.68 |
| 140% | 57.28 | 75.91 | 80.43 | 82.89 | 81.09 |
| 120% | 60.04 | 81.66 | 87.70 | 87.70 | 89.42 |
| 100% | 60.54 | 82.91 | 90.33 | 94.63 | 93.04 |
| 80% | 59.19 | 80.77 | 88.10 | 92.33 | 90.92 |

As shown in Table 6, the isolated word acceptance is minimized in the case of the 180% learning and enquiring loudness. Compared with Table 3, the Table 6 shows that the isolated word acceptance of the voice recognition system 1 according to the present invention is decreased on the whole. Thus, the registered speaker can be the most correctly verified by allowing the enquiring speaker to utter again when the enquiring speaker utters with insufficient loudness.

As described above, in the voice recognition system 1 according to the present invention, it is determined at learning the voice whether the voice of the enquiring speaker is within the predetermined loudness range of the background speakers, and only the voice within the predetermined loudness range is analyzed, thereby forming the speaker pattern. Further, it is determined at the speaker verification whether the voice of the enquiring speaker is within the predetermined loudness range of the background speakers, and the speaker scores of only the voices within the predetermined loudness range are calculated, thereby rejecting or accepting the enquiring speaker.

As described above, in the voice recognition system 1 according to the present invention, the recognition is the most efficient with 100% loudness at the learning and the verification, whereas the more the loudness is different from 100%, the more the recognition efficiency is decreased. That is, in the conventional voice recognition system the recognition efficiency and the loudness are not correlated, but in the voice recognition system according to the present invention the isolated word acceptance is decreased in proportion to a rise in the loudness difference between the enquiring and learning speakers, to thereby make the enquiring speaker re-utter. Thus, the false acceptance expressing the rate of falsely accepting the non-registered speaker is decreased, and the enquiring speaker has an opportunity to re-utter when his/her voice is not within the predetermined loudness range of the background speakers, thereby improving confidence in the voice recognition system.

As described above, according to the present invention, loudness of a speaker is considered at learning for registering his/her voice and at verifying a speaker, so that it is possible to more correctly verify the speaker.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A voice registration method for voice recognition, comprising the steps of:
    analyzing a spectrum of a sound signal inputted from the outside;
    extracting predetermined language units for a speaker recognition from a voice signal in the sound signal;
    measuring the loudness of each language unit;
    collecting voice data on registered speakers including loudness data of the plurality of background speakers as a reference onto voice database;
    determining whether the loudness of each language unit is within a predetermined loudness range based on the voice data base;
    learning each language unit by using a multi-layer perceptron in the case that at least a predetermined number of language units are within the predetermined loudness range; and
    storing data on the learned language unit as data for recognizing the speaker.

2. The method according to claim 1, wherein the voice analyzing step includes the steps of:
    representing the voice signal of the speaker as a spectrum; and
    compressing the spectrum by allocating filter banks to a speaker recognition region in which a voice characteristics of the speaker is to be recognized.

3. The method according to claim 2, wherein the storing step is comprised of storing the plurality of speaker patterns of every language unit and the loudness of every language unit as a speaker recognition data.

4. The method according to claim 2, wherein the speaker recognition region is 0~3 KHz in which the filter banks are uniformly allocated, whereas over 3 KHz the intervals of the filter banks become logarithmically increased.

5. The method according to claim 4, wherein the storing step is comprised of storing the plurality of speaker patterns of every language unit and the loudness of every language unit as a speaker recognition data.

6. The method according to claim 4, further comprising the step of employing a plurality of phonemes selected from nasals, vowels, and approximants which include relatively lots of continuous sound as the language units,
    wherein the language unit extracting step includes the steps of making a plurality of frames by dividing the spectrum into several parts, and extracting a frame having the language unit among the frames.

7. The method according to claim 6, wherein the storing step is comprised of storing the plurality of speaker patterns of every language unit and the loudness of every language unit as a speaker recognition data.

8. The method according to claim 6, wherein the loudness measuring step is comprised of calculating an energy value of the frame having the language unit of the spectrum.

9. The method according to claim 8, wherein the storing step is comprised of storing the plurality of speaker patterns of every language unit and the loudness of every language unit as a speaker recognition data.

10. The method according to claim 8, further comprising the step of extracting maximum and minimum loudness by analyzing the voice spectrum of the background speakers stored in the voice database and by calculating the energy value of the frame having the language unit,
    wherein the loudness determining step is comprised of determining whether the number of the frames having the loudness within the maximum and minimum loudness occupies a predetermined rate or more.

11. The method according to claim 10, wherein the storing step is comprised of storing the plurality of speaker patterns of every language unit and the loudness of every language unit as a speaker recognition data.

12. The method according to claim 10, further comprising the steps of forming a plurality of reference patterns to every language unit of the plurality of background speakers, and forming a plurality of speaker patterns to every language unit of the plurality of speakers,
    wherein the learning step includes the step of learning a pattern characteristics of the speaker by comparing the reference patterns with the speaker patterns according to a back-propagation algorithm.

13. The method according to claim 12, wherein the storing step is comprised of storing the plurality of speaker patterns of every language unit and the loudness of every language unit as a speaker recognition data.

14. The method according to claim 12, further comprising the step of making learning groups as many as the number of language units of the background speakers by employing the plurality of reference patterns to every language unit of one background speaker as a learning group,
    wherein the learning step is comprised of learning the pattern characteristics of the speaker by comparing the reference patterns of every learning group with the plurality of the speaker patterns.

15. The method according to claim 14, wherein the storing step is comprised of storing the plurality of speaker patterns of every language unit and the loudness of every language unit as a speaker recognition data.

16. The method according to claim 1, wherein the storing step is comprised of storing the plurality of speaker patterns of every language unit and the loudness of every language unit as a speaker recognition data.

17. The method according to claim 1, further comprising the step of requesting the speaker to re-utter in the case that at least the predetermined number of language units are not within the predetermined loudness range.

18. A speaker recognition method for recognizing whether a speaker is a registered speaker, comprising the steps of:
- analyzing a spectrum of a sound signal inputted from the outside;
- extracting predetermined language units for a speaker recognition from a voice signal in the sound signal;
- measuring the loudness of each language unit;
- determining whether the loudness of each language unit is within a predetermined loudness range;
- calculating a speaker score by calculating the probability that the language unit will belong to the speaker through a multi-layer perceptron, and by averaging the probability, in the case that at least a predetermined number of language units are within the predetermined loudness range; and
- verifying that the speaker is registered when the speaker score is beyond a threshold value by comparing the calculated speaker score with the predetermined threshold value which is a predetermined minimum speaker score for verifying the registered speaker.

19. The method according to claim 18, wherein the speaker score can be calculated from the following equation $$Score_{speaker} = \frac{1}{M}\sum_{i=0}^{M-1} P(LU_i)$$

where $P(LU_i)$ is a score of the probability that the enquiring speaker is the background speaker of an $i^{th}$ language unit frame, and M is the number of language unit frame extracted from an isolated word.

20. The method according to claim 19, wherein the speaker score can be calculated on the basis of weight of the language units given according to verifiability.

21. A voice recognition system for voice recognition, comprising:
- a voice analyzer analyzing a spectrum of a sound signal inputted from the outside;
- a voice extractor extracting a voice signal from the sound signal and extracting predetermined language units for recognizing a speaker from the voice signal;
- a voice database storing therein background speaker voice data including the loudness of a plurality of reference background speakers;
- a loudness determiner determining the loudness of each language unit, and determining whether the loudness of each language unit is within a predetermined loudness range on the basis of the voice database;
- a learner learning the language unit in the case that at least a predetermined number of additional ones of the language units are within the predetermined loudness range;
- a memory storing data on the learned language units as recognition data for the speaker; and
- a controller controlling operations of the voice analyzer, the voice extractor, the loudness determiner and the learner when a voice is inputted, and storing the recognition data for the speaker in the memory.

22. The system according to claim 21, wherein the voice analyzer represents the voice signal of the speaker as a spectrum, and compresses the spectrum by allocating filter banks to a speaker recognition region in which the speaker is to be recognized, at a predetermined interval rate.

23. The system according to claim 22, wherein the speaker recognition region is 0~3 KHz in which the filter banks are uniformly allocated, whereas over 3 KHz the intervals of the filter banks become logarithmically increased.

24. The system according to claim 23, wherein the voice extractor makes a plurality of frames by dividing the spectrum into several parts, and extracting a frame having phonemes selected from nasals, vowels, and approximants, which include relatively lots of continuous sound as the language units the language unit, among the plurality of frames.

25. The system according to claim 24, wherein the loudness determiner calculates an energy value of the frame having the language unit of the spectrum.

26. The system according to claim 25, wherein the loudness determiner previously determines maximum and minimum loudness by analyzing the voice spectrum of the background speakers stored in the voice database and by calculating the energy value of the frame having the language unit, and determines whether the number of the frame having the loudness within the maximum and minimum loudness is beyond a predetermined rate.

27. The system according to claim 26, wherein the voice extractor forms a plurality of reference patterns corresponding to every language unit of the plurality of background speakers, and forms a plurality of speaker patterns to every language unit of the plurality of speakers; makes a plurality of learning groups by employing the plurality of reference patterns to every language unit of one background speaker as one learning group.

28. The system according to claim 27, wherein the learner learns a pattern property of the speaker by comparing the reference patterns with the speaker patterns according to a back-propagation algorithm.

29. The system according to claim 28, wherein in the memory are stored the plurality of speaker patterns of every language unit and the loudness of every language unit as a speaker recognition data.

30. The system according to claim 29, wherein the controller requests the speaker to re-utter in the case that at least the predetermined number more among all language units of the isolated word is within the predetermined loudness range.

31. A speaker recognition system for recognizing whether a speaker is a registered speaker, comprising:
- a voice analyzer analyzing a spectrum of a voice signal inputted from external sound signals;
- a voice extractor picking out voice signals among inputted sound and abstracting predetermined language units for recognizing the speaker from the voice signals;
- a loudness determiner determining the loudness of each language unit, and determining whether the loudness of each language unit is within a predetermined loudness range;

a speaker score calculator calculating a speaker score by calculating probability of that the language unit will belong to the speaker, and by averaging the probability; and a controller controlling the speaker score calculator to calculate the speaker score in the case that at least the predetermined number more among all language units is within the predetermined loudness range, and ascertaining that the speaker has been registered when the speaker score is beyond a threshold value by comparing the calculated speaker score with the predetermined threshold value which is a predetermined minimum speaker score for ascertaining the registered speaker.

32. The system according to claim 31, wherein the speaker score can be derived from $$Score_{speaker} = \frac{1}{M} \sum_{i=0}^{M-1} P(LU_i)$$

Where $P(LU_i)$ is a probability score of that the enquiring speaker is the background speaker of an $i^{th}$ language unit frame, and M is the number of language unit frame abstracted from the isolated word.

33. The system according to claim 32, wherein the speaker score calculator calculates the speaker score on the basis of the language units according to discrimination.

* * * * *